United States Patent [19]

Iwasaki

[11] Patent Number: 4,785,179
[45] Date of Patent: Nov. 15, 1988

[54] RADIATION PHOTOGRAPHING AND READING APPARATUS

[75] Inventor: Kenji Iwasaki, Utsunomiya, Japan

[73] Assignee: Kabushiki Kaisha Toshiba, Kawasaki, Japan

[21] Appl. No.: 57,665

[22] Filed: Jun. 10, 1987

Related U.S. Application Data

[63] Continuation of Ser. No. 659,314, Oct. 10, 1984, abandoned.

[30] Foreign Application Priority Data

Oct. 11, 1983 [JP] Japan .................................. 58-190342

[51] Int. Cl.⁴ ............................ G01J 1/42; G03C 5/16
[52] U.S. Cl. .................................... 250/372; 378/173; 378/172
[58] Field of Search ............................... 378/172, 173; 250/484.1, 505.1, 327.2 J, 327.2 K

[56] References Cited

U.S. PATENT DOCUMENTS

| | | | |
|---|---|---|---|
| 3,971,949 | 7/1976 | Bräther et al. | 378/173 |
| 4,019,061 | 4/1977 | Finkenzeller et al. | 378/173 |
| 4,439,682 | 3/1984 | Matsumoto et al. | 250/484.1 |
| 4,485,304 | 11/1984 | Teraoka et al. | 378/173 |

OTHER PUBLICATIONS

Japanese Utility Model Publication (Kokai) No. 52-9368.

Primary Examiner—Carolyn E. Fields
Assistant Examiner—David P. Porta
Attorney, Agent, or Firm—Finnegan, Henderson, Farabow, Garrett & Dunner

[57] ABSTRACT

A radiation photographing and reading apparatus according to the present invention is provided with transfer conveyors for automatically transferring reusable radiation image converting plates from a photographing housing as a movable member of a radiation photographing device to a fixed housing of a reading device. When each exposed radiation image converting plate is transferred by the transfer conveyors, the photographing housing and the fixed housing are connected by means of a shielding coupling, whereby a transfer passage between the two housings is shielded from light.

12 Claims, 6 Drawing Sheets

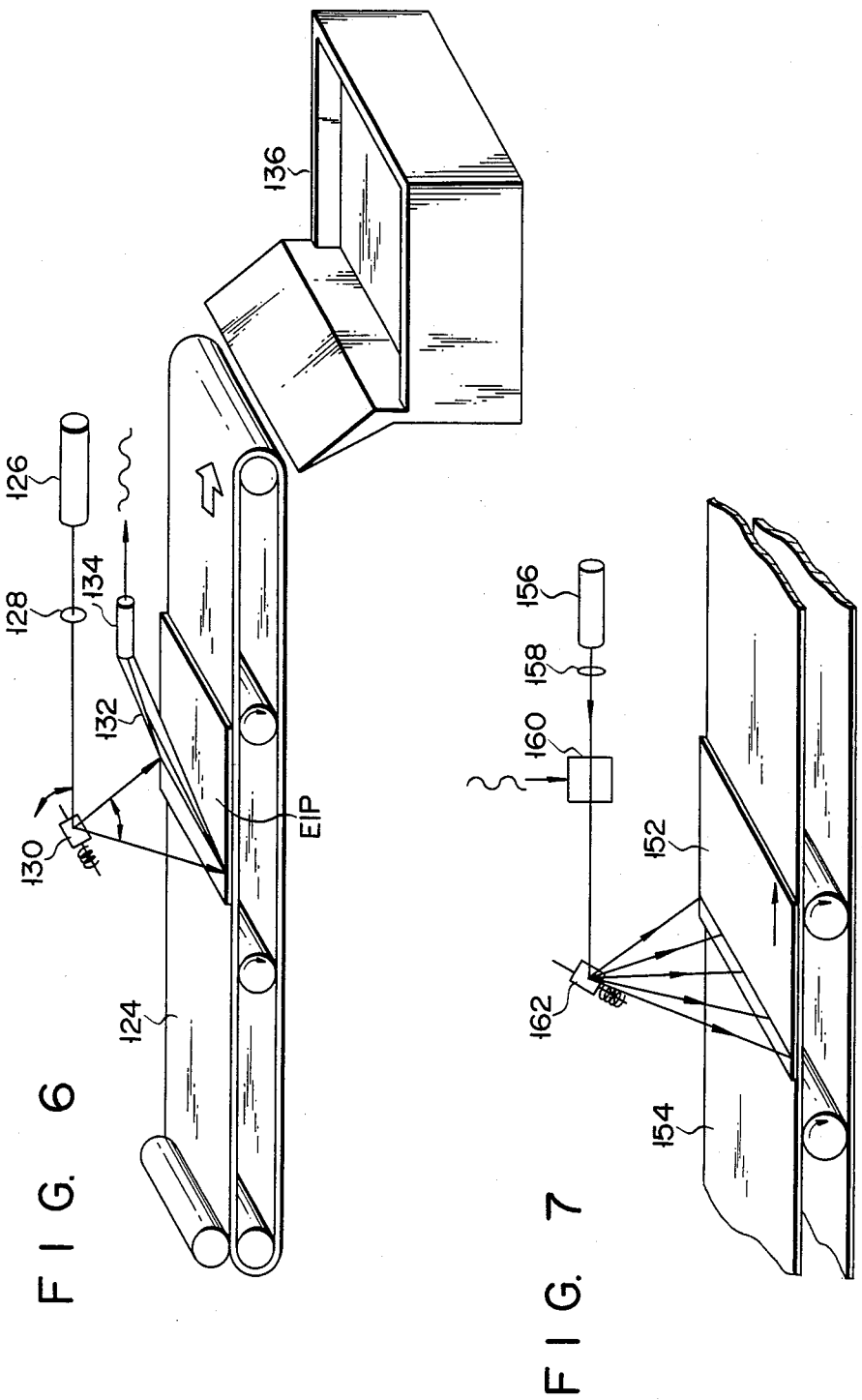

RADIATION PHOTOGRAPHING AND READING APPARATUS

This application is a continuation of application Ser. No. 06/659,314, filed Oct. 10, 1984, now abandoned.

BACKGROUND OF THE INVENTION

The present invention relates to a radiation photographing and reading apparatus adapted to perform radiation photographing by the use of radiation image converting plates and to read X-ray images recorded on the radiation image converting plates after converting the images into electric signals.

First, the principle of a radiation photographing apparatus using the radiation image converting plates, e.g., an X-ray photographing apparatus, will be described in brief. X-rays emitted from an X-ray tube of the X-ray photographing apparatus are applied to a radiation image converting plate, transmitted through the body of a patient lying on an X-ray transmitting table. The radiation image converting plate is coated with a stimulable phosphor material. Thus, the X-ray transmitted through the patient body are absorbed by the stimulable phosphor material of the radiation image converting plate, so that an X-ray image of the patient body is recorded on the radiation image converting plate.

Thereafter, the radiation image converting plate with the X-ray image thereon is taken out from the X-ray photographing apparatus, and set in an image reading apparatus. In the image reading apparatus, the recording surface of the radiation image converting plate on which the X-ray image is recorded is scanned with, e.g., a fine laser beam. As the recording surface of the radiation image converting plate is scanned with the laser beam, it emits a light corresponding to the dose of X-rays absorbed thereby. The image reading apparatus converts this light into an electric signal and delivers it as an output to an image processing apparatus. In the image processing apparatus, the electric signal is electrically processed so that image information as an electric signal is supplied to a CRT. Thus, the image information is displayed on the screen of the CRT or delivered to an image writing apparatus. In the image writing apparatus, the image is stored in the film. Thereafter, the film is developed in an automatic developing apparatus to provide an X-ray photograph.

In the prior art X-ray photographing apparatus described above, the exposed radiation image converting plate must be kept from being irradiated when it is carried into the image reading apparatus to be set therein. In doing this, therefore, the exposed radiation image converting plate is contained in a cassette or magazine. Thus, it takes much time and labor to transfer the exposed radiation image converting plates from the X-ray photographing apparatus or the X-ray transmitting table to the image recording apparatus.

To reduce the time and labor required to achieve this transfer of the plates, an image reading apparatus may be attached to the X-ray transmitting table. However, the image reading apparatus, whose structure is complex and intricate, may malfunction due to minor vibration. Since the table is turned or moved and thus is vibrated, attaching the image reading apparatus to the table is unacceptable.

In consideration of these circumstances, it is desirable that the exposed radiation image converting plate be automatically moved from the X-ray transmitting table to the image reading apparatus while keeping the image reading apparatus secured on a floor. In an X-ray photographing apparatus of a type in which the position of the X-ray transmitting table can be shifted, however, the X-ray transmitting table acts as a movable member as compared with the fixed image reading apparatus. Accordingly, it is difficult to convey the exposed radiation image converting plate from the X-ray transmitting table to the image reading apparatus in a satisfactory shading condition.

SUMMARY OF THE INVENTION

The object of the present invention is to provide a radiation photographing and reading apparatus combining a radiation photographing apparatus and an image reading apparatus so that exposed radiation image converting plates can automatically be transferred from the radiation photographing apparatus to the image reading apparatus in a positively shielded state, thereby reducing the time and labor required for radiation photographing.

The above object may be achieved by a radiation photographing and reading apparatus which comprises a radiation image converting plate capable of absorbing the energy of radiation and adapted to emit the absorbed radiation energy as a stimulable light when exposed to a light beam, a radiation photographing device for setting the radiation image converting plate in a photographing position for radiation photographing on the body of a patient, the radiation photographing device including a movable base, a radiation tube for irradiation provided to the base, and a photographing housing mounted on the base so as to face the radiation tube and capable of intercepting light and of moving together with the base, the photographing housing containing therein a holder for holding the radiation image converting plate in the photographing position facing the radiation tube, a reading device adapted to scan the radiation image converting plate exposed to radiation by radiation photographing of the patient body with a light beam and to detect and convert into an electric signal the stimulable light emitted from the radiation image converting plate by the scanning with the light beam, thereby reading a fluoroscopic image of the patient body, the reading device having a fixed housing fixedly disposed beside the radiation photographing device and capable of intercepting light, transfer means for transferring the exposed radiation image converting plate from the holder in the photographing housing to the reading device, and shielding means for preventing the exposed radiation image converting plate from being exposed to external light while the radiation image converting plate is being transferred by the transfer means.

According to the present invention, the radiation photographing and reading apparatus is provided with the transfer means for transferring the exposed radiation image converting plate from the holder in the photographing housing to the reading device and the shielding means for preventing the exposed radiation image converting plate from being exposed to external light while the radiation image converting plate is being transferred by the transfer means, so that the exposed radiation image converting plate can be transferred from the photographing housing to the fixed housing of the reading device without being exposed to external light. Thus, in the radiation photographing and reading apparatus of the invention, all the processes from radiation photographing using the radiation image converting plate to the reading of the radiation image recorded on the radiation image converting plate can be executed automatically. Thus, it is unnecessary to manually take out the radiation image converting plate in the magazine from the radiation photographing device and carry it into the reading device, so that the time and labor required for radiation photographing can greatly be reduced.

According to an aspect of the invention, the radiation photographing and reading apparatus is provided with feeding means for feeding the radiation image converting plate from the fixed housing into the photographing housing, so that the radiation image converting plate can automatically be fed into the photographing housing, further reducing the time and labor required for radiation photographing. After reading is ended, moreover, the radiation image converting plate can be returned to the feeding means to be reused without being carried out from the fixed housing.

BRIEF DESCRIPTION OF THE DRAWINGS

FIG. 6 is a perspective view schematically showing the principle of a reading device;

FIG. 7 is a perspective view schematically showing the principle of an image recording apparatus;

DETAILED DESCRIPTION OF THE PREFERRED EMBODIMENTS

Figure 1:
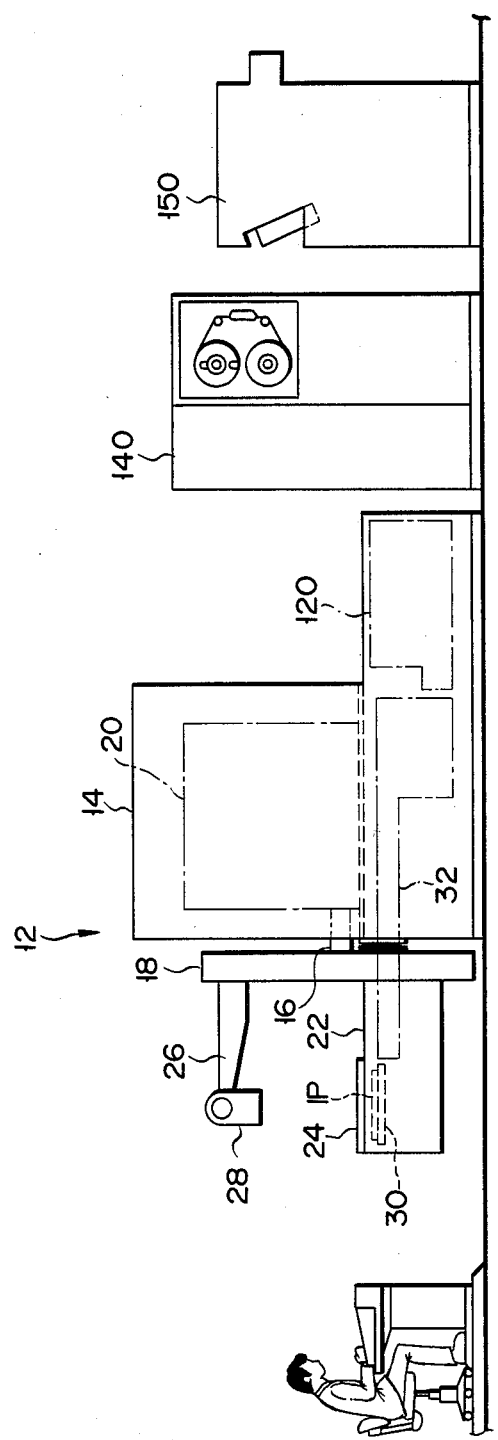
FIG. 1 is a schematic general view showing a system including a radiation photographing and reading apparatus according to one embodiment of the present invention.

Referring now to FIG. 1, there is schematically shown an X-ray photographing system which includes an X-ray photographing and reading apparatus 12 according to one embodiment of the present invention. The X-ray photographing and reading apparatus 12 is provided with a fixed main housing 14 which can shield light. A rotating shaft 16 protrudes horizontally from one side face of the main housing 14, and a circular rotating base 18 is mounted on the projected end of the rotating shaft 16. The other end of the rotating shaft 16 is coupled to a rotating mechanism or electric reversible motor 20 which is disposed in the upper portion of the main housing 14. Thus, the rotating base 18 is rotated in both forward and reverse directions by the electric motor 20.

A bed housing 22 capable of shielding light is rigidly attached to the rotating base 18. The bed housing 22 supports thereon an X-ray transmitting table 24 on which a patient can lie. A horizontally extending support arm 26 is attached to the peripheral portion of the rotating base 18. An X-ray tube 28 is mounted on the support arm 26 so as to face the X-ray transmitting table 24. The X-ray tube 28 is supplied with a high voltage by a high voltage generating unit (not shown), whereby the X-ray tube 28 radiates X-rays toward the X-ray transmitting table 24.

A photograph holder 30 supporting an X-ray image converting plate (or imaging plate; hereinafter referred to simply as IP) is disposed in the bed housing 22, located directly under the X-ray transmitting table 24. The IP and the photograph holder 30 will be described in detail below.

Thus, if X-rays from the X-ray tube 28 are applied to the patient (not shown) lying on the X-ray transmitting table 24 with the IP on the photograph holder 30, the IP is exposed to the X-rays transmitted through the patient and the X-ray transmitting base 24. As a result, an X-ray image of the patient is recorded on the IP. Since the rotating base 18 is rotatable, the posture of the patient can be changed at the time of X-ray photographing by inclining the bed housing 22 or the X-ray transmitting table 24 relatively to the floor surface.

A TV camera unit (not shown) is disposed in the bed housing 22. The TV camera unit includes an image intensifier for fluoroscopy and an image pickup tube which picks up a phosphor image delivered from the image intensifier and produces a video signal. The video signal from the TV camera unit is delivered to a monitor TV (not shown) to be displayed thereon.

The IP is formed by coating a base sheet of, for example polyester with a coating solution which is prepared by filling a binder with crystals of BaFX (X is halogen) of high density. In other words, the IP is formed of the base sheet and an image recording layer composed of halogen crystals. Accordingly, if the IP is exposed to the X-rays transmitted through the patient, the energy of the X-rays is trapped in the image recording layer of the IP to cause the X-ray image of the patient to be recorded on the IP.

In this embodiment, the IP is fed from the main housing 14 into the bed housing 22, and is returned from the latter to the former on completion of X-ray photographing. A circulating mechanism 32 for IP between the main housing 14 and the bed housing 22 will now be described.

Figure 2:
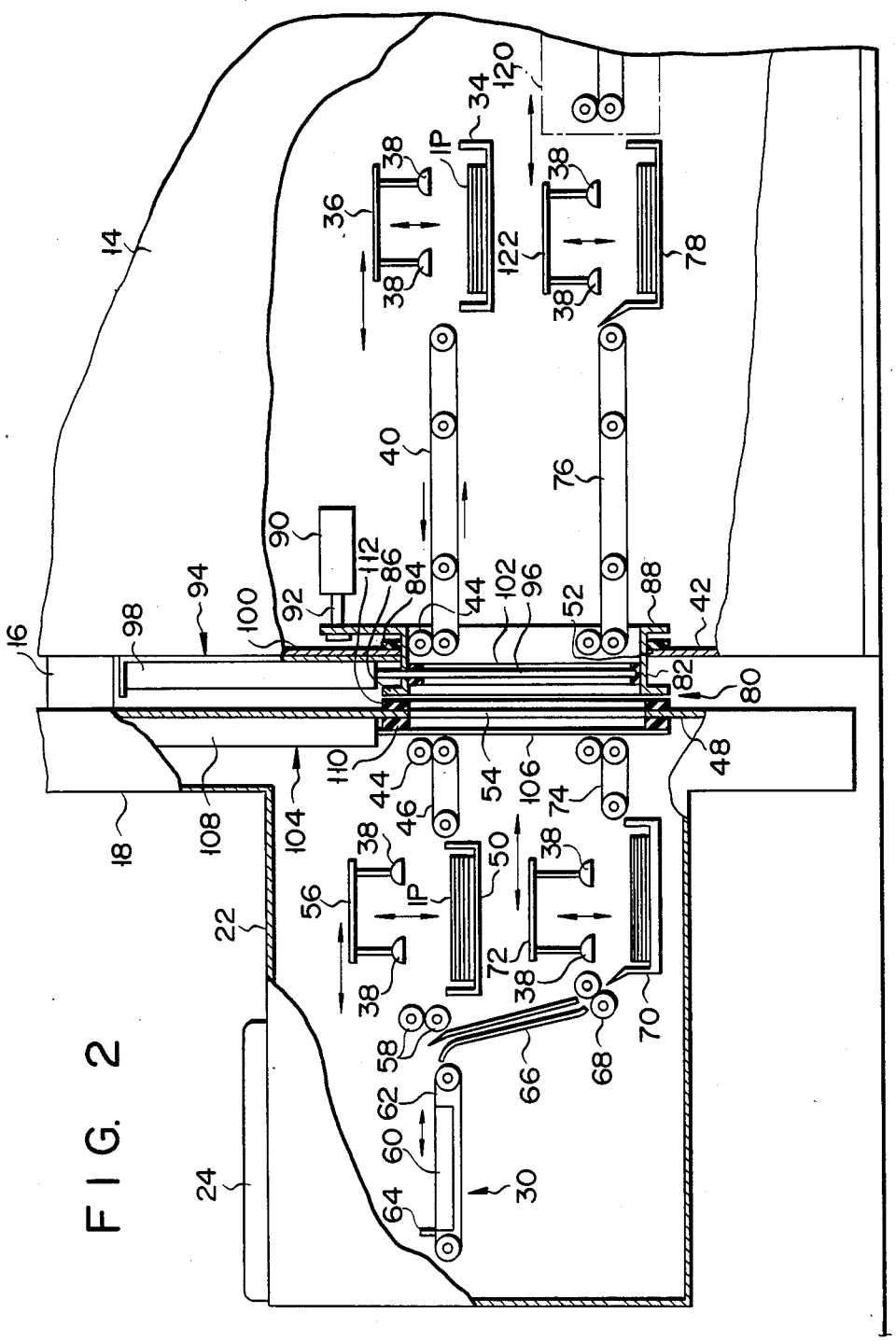
FIG. 2 is a cutaway, schematic view of the radiation photographing and reading apparatus shown in FIG. 1.

Referring to FIG. 2, the IP circulating mechanism 32 is schematically shown. The circulating mechanism 32 is provided with a first IP tray 34 for storing a number of unexposed IPs in the main housing 14. A first vacuum chuck 36 is disposed over the first IP tray 34. The first vacuum chuck 36, which has a plurality of suction cups 38 for sucking the IPs one by one, can move vertically and horizontally, as indicated by arrows in FIG. 2. The first vacuum chuck 36 is driven by a moving mechanism (not shown), and the suction cups 38 are connected to a vacuum pump (not shown). Thus, the IPs contained in the first IP tray 34 are taken out one after another by the first vacuum chuck 36, and are transferred toward a first feed belt conveyor 40 which adjoins the first IP tray 34. As shown in FIG. 2, the first feed belt conveyor 40 horizontally extends close to a side wall 42 of the main housing 14 adjacent to the bed housing 22. A pinch roller 44 is set at least on that end portion of the first feed belt conveyor 40 which is located beside the side wall 42 of the main housing 14. Thus, the IPs transferred to the first feed belt conveyor 40 by the first vacuum chuck 36 and placed on the traveling belt of the first feed belt conveyor 40 are fed toward the bed housing 22 as the belt travels.

A second feed belt conveyor 46 similar to the first feed belt conveyor 40 is disposed in the bed housing 22. The second feed belt conveyor 46 horizontally extends from the region near a side wall 48 of the bed housing 22 adjacent to the side wall 42 of the main housing 14 into the bed housing 22. The second feed belt conveyor 46 receives and transfers the IPs delivered by the first feed belt conveyor 40, and feeds them into a second IP tray 50 which is disposed in the bed housing 22.

The IPs are delivered from the first feed belt conveyor 40 to the second feed belt conveyor 46 through rectangular openings 52 and 54 which are formed in the side walls 42 and 48 of the main housing 14 and the bed housing 22, respectively. Since the distance between the first and second feed belt conveyors 40 and 46 is shorter than the length of each IP along its feeding direction, the IPs can be delivered from the first feed belt conveyor 40 to the second feed belt conveyor 46 without hindrance. A shielding mechanism 80 (mentioned later) is used in opening and closing the respective openings 52 and 54 of the main housing 14 and the bed housing 22 and in shielding light between the openings 52 and 54 at the time of the delivery of the Ips from the main housing 14 to the bed housing 22.

A second vacuum chuck 56 similar to the first vacuum chuck 36 is disposed over the second IP tray 50. The second vacuum chuck 56 takes out the IPs in the second IP tray 50 one by one and transfers them to a pair of first feed rollers 58. The first feed rollers 58 feed each IP between them toward the photographing holder 30. The photograph holder 30 comprises a supporting plate 60, an endless belt 62 capable of traveling in either direction on the supporting plate 60, and an IP positioning stopper 64. The IP delivered from the first feed rollers 58 is transferred to the top of the supporting plate 60 as the endless belt 62 travels. Then, the IP abuts against the positioning stopper 64 to be held in a predetermined photographing position.

An IP, which is exposed on the photograph holder 30 so that the X-ray image of the patient is recorded thereon (hereinafter referred to simply as EIP), is taken out from the photograph holder 30 as the endless belt 62 is driven in the reverse direction. The EIP removed from the photograph holder 30 is led into a third IP tray 70 below the photograph holder 30 by a guide chute 66 and a pair of second feed rollers 68 similar to the first feed rollers 58. A third vacuum chuck 72 similar to the first and second vacuum chucks 36 and 56 is disposed over the third IP tray 70, and a first return belt conveyor 74 resembling the second feed belt conveyor 46 extends between the third IP tray 70 and the side wall 48 of the bed housing 22. Likewise, a second return belt conveyor 76, resembling the first feed belt conveyor 40, and a fourth IP tray 78 are disposed in the main housing 14. Thus, the EIPs taken out one by one from the third IP tray 70 by the third vacuum chuck 72 are carried into the fourth IP tray 78 by the first and second return belt conveyors 74 and 76. The delivery of the EIPs between the first and second return belt conveyors 74 and 76 is achieved also by the use of the openings 54 and 52 of the bed housing 22 and the main housing 14 respectively and the shielding mechanism 80.

The shielding mechanism 80 will now be described in detail. The shielding mechanism 80 is provided with a shielding coupling 82 in the form of a hollow square pillar fitted in the opening 52 of the main housing 14.

The shielding coupling 82 can move along its axis. A shielding seal 84, adapted to be in sliding contact with the outer surface of the shielding coupling 82, is attached to the inner surface of the side wall 42 of the main housing 14. The shielding seal 84 is formed of felt, for example. One end of the shielding coupling 82 projects from the main housing 14, and a flange portion 86 is formed on the outer periphery of the projected end of the coupling 82. Also, a flange portion 88 is formed on the periphery of the inner end of the shielding coupling 82. Part of the flange portion 88 extends radially outward and is coupled to, for example, a rod 92 of a pneumatic cylinder 90. Thus, the shielding coupling 82 can be axially moved by extending or contracting the rod 92 of the pneumatic cylinder 90.

Figure 3:
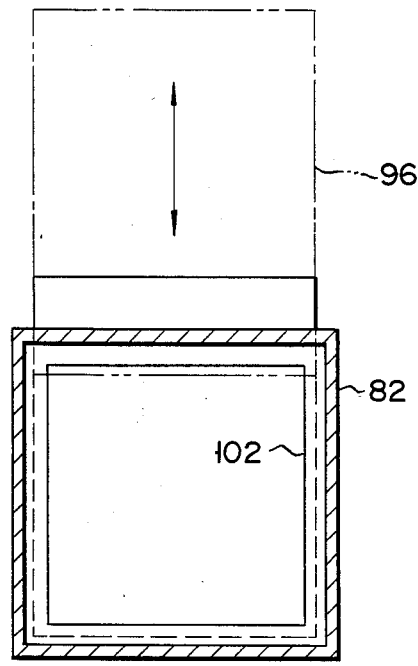
FIG. 3 is a sectional view showing a shielding coupling closed by a shielding shutter.

A first shielding shutter 94 for opening and closing the internal passage of the shielding coupling 82 is attached to that portion of the shielding coupling 82 which is projected from the main housing 14. The first shielding shutter 94 comprises a shielding plate 96 slidably penetrating the top wall of the coupling 82 to close the internal passage of the coupling 82 and a driving portion 98 for vertically moving the plate 96. The driving portion 98 includes, e.g., a pneumatic cylinder and is fixed to a holder plate 100 which is attached to the shielding coupling 82. As shown in FIGS. 2 and 3, a shielding member 102 is attached to the inner peripheral wall of the coupling 82. The shielding member 102 guides the plate 96 in its vertical motion and, in conjunction with the shielding plate 96, prevents light from entering the main housing 14.

As shown in FIG. 2, a second shielding shutter 104 for opening and closing the opening 54 of the bed housing 22 is attached to the side wall 48 of the bed housing 22. Like the first shielding shutter 94, the second shutter 104 comprises a shielding plate 106 and a driving portion 108 for vertically moving the plate 106. The driving portion 108 is fixed to the inner surface of the side wall 48 of the bed housing 22. Also, a shielding seal 110 formed of felt or other material is attached to the inner surface of the side wall 48 of the bed housing 22 so as to surround the opening 54. The shielding seal 110, in conjunction with the plate 106, serves securely to shield the inside of the bed housing 22 from light.

Another shielding seal 112 formed of felt or other material is attached to the outer surface of the side wall 48 of the bed housing 22 so as to surround the opening 54. The seal 112 securely shields the inside of the coupling 82 from light by abutting against the flange portion 86 of the coupling 82.

Figure 4:
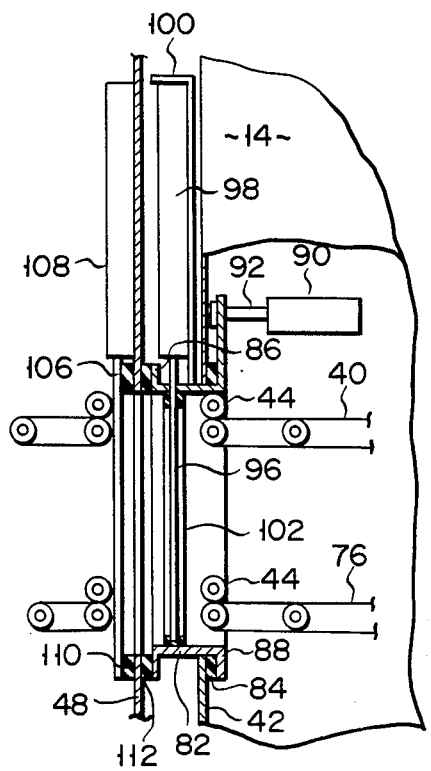
FIGS. 4 and 5 are diagrams for illustrating the operation of the shielding coupling.
Figure 5:
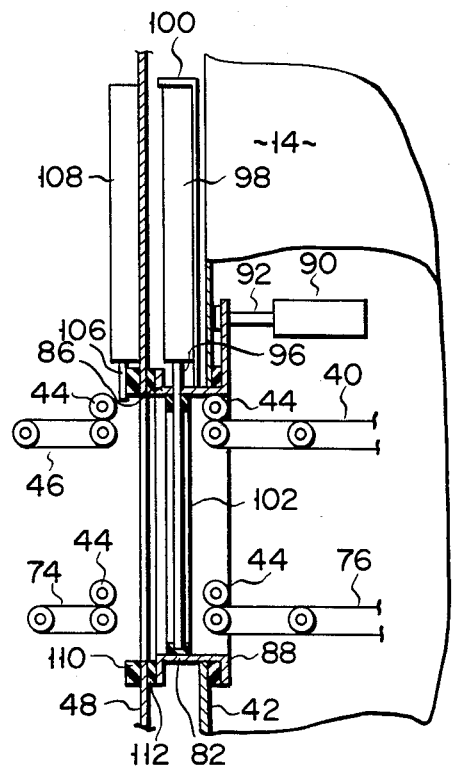

Thus, in the X-ray photographing and reading apparatus of the invention, provided with the shielding mechanism 80 described above, the interior of the main housing 14 can be connected with that of the bed housing 22 in a positively shielding manner. More specifically, if the flange portion 86 of the shielding coupling 82 is first caused to engage the seal 112 of the bed housing 22 by extending the rod 92 of the pneumatic cylinder 90 from the position shown in FIG. 2, the bed housing 22 and the main housing 14 are connected by means of the shielding coupling 82, and the internal passage of the coupling 82 is securely shielded from external light, as shown in FIG. 4. Thereafter, if the first and second shutters 94 and 104 are opened, as shown in FIG. 5, the interiors of the main housing 14 and the bed housing 22 are connected through the internal passage of the coupling 82.

Thus, in feeding the unexposed IPs from the main housing 14 into the bed housing 22 and in returning the exposed IPs from the bed housing 22 to the main housing 14 by means of the IP circulating mechanism 32, the IPs are securely prevented from being exposed to external light. The delivery of the IPs between the main housing 14 and the bed housing 22 by the circulating mechanism 32 is performed after the opening 54 of the bed housing 22 is aligned with the opening 52 of the main housing 14 by rotating the rotating base 18.

Referring again to FIG. 2, the exposed IPs or EIPs, which are temporarily held in the fourth IP tray 78 inside the main housing 14 as previously mentioned before, are taken out one by one from the fourth IP tray 78 and transferred to an image reading device 120 disposed in the main housing 14. A fourth vacuum chuck 122 is provided over the fourth IP tray 78, whereby the EIPs in the fourth IP tray 78 are taken out one after another and delivered to the image reading device 120.

The image reading device 120 is schematically shown in FIG. 6. Since it has a conventional construction, the image reading device 120 will be described only briefly here: The image reading device 120 is provided with a transfer conveyor 124 which transfers the EIPs delivered thereto by the fourth vacuum chuck 122 (FIG. 2). A laser tube 126 is disposed above the transfer conveyor 124. A laser beam emitted from the laser tube 126 is converged into a narrow laser beam with a diameter of 50 to 200 microns by a lens 128. The narrow laser beam is reflected by a rotating reflector 130 for scanning, whereby the image recording surface of each EIP transferred thereto on the transfer conveyor 124 is scanned in the direction perpendicular to the course of transfer. As the EIP is transferred, therefore, the whole image recording surface of the EIP is scanned with the narrow laser beam. When scanned with the laser beam in this manner, the image recording surface of the EIP produces fluorescence with a wavelength different from that of the laser beam. The quantity of the fluorescence is in proportion to the dose of X-rays absorbed by the stimulable phosphor material contained in the image recording layer of the EIP.

The fluorescence emitted from the image recording surface of the EIP is transmitted to a photomultiplier tube 134 through a collecting optical fiber 132. The photomultiplier tube 134 converts the fluorescence into an electric signal as an output.

The EIP, whose recording surface is wholly scanned, is carried into a fifth IP tray 136 located ahead of the transfer conveyor 124. Thereafter, the EIP in the fifth IP tray 136 is delivered to an erasing device (not shown), where the image information recorded on the image recording layer of the EIP is erased. The erasing device includes a special fluorescent lamp (discharge lamp or electric lamp) which can apply a light of 200,000 lx sec or more to the image recording surface of the EIP, thereby erasing the image information on the image recording layer of the EIP. The IP cleared of the image information is returned to the first IP tray 34 by means of a transfer system (not shown). Thus, the IP can be repeatedly used for X-ray photographing.

As shown in FIG. 1, the X-ray photographing and reading apparatus according to the one embodiment of the invention is remotely controlled by means of a console which is set in a position remote from the apparatus.

The method in which the electric signal delivered from the image reading device 120 of the X-ray photographing and reading apparatus is processed will now be described. The electric signal as image information delivered from the image reading device 120 is transmitted to an image processing device 140 (FIG. 1). In the image processing device 140, the received electric signal is electrically processed for subtraction or other image processing effect, and the processed signal is transferred to an image recording device 150. The principle of the image recording device 150 is schematically illustrated in FIG. 7. The image recording device 150 is provided with a transfer conveyor 154 for transferring a film 152. A laser tube 156 is disposed over the transfer conveyor 154. A laser beam emitted from the laser tube 156 is converged into a narrow laser beam by a lens 158. The narrow laser beam is modulated by an optical modulator 160 which is supplied with the electric signal delivered from the image reading device 120, and is then reflected by a rotating reflector 162 for scanning. Thus, the upper surface of the film 152 transferred on the transfer conveyor 124 is scanned in the direction perpendicular to its course of transfer. As the film 152 is transferred, therefore, the whole upper surface of the film 152 is scanned with the laser beam. As a result, the same X-ray image or latent X-ray image as recorded on the EIP is formed on the film 152. Thereafter, the film 152 with the latent X-ray image thereon is developed to provide an X-ray photograph.

Figure 8:
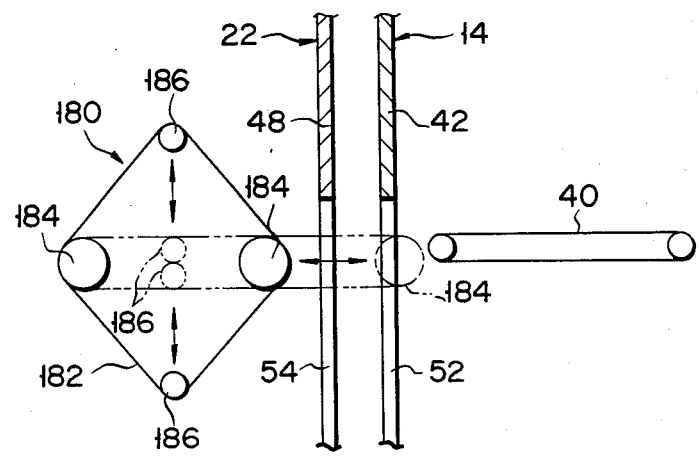
FIG. 8 is a schematic view showing a modification of a second feed belt conveyor.
Figure 10:
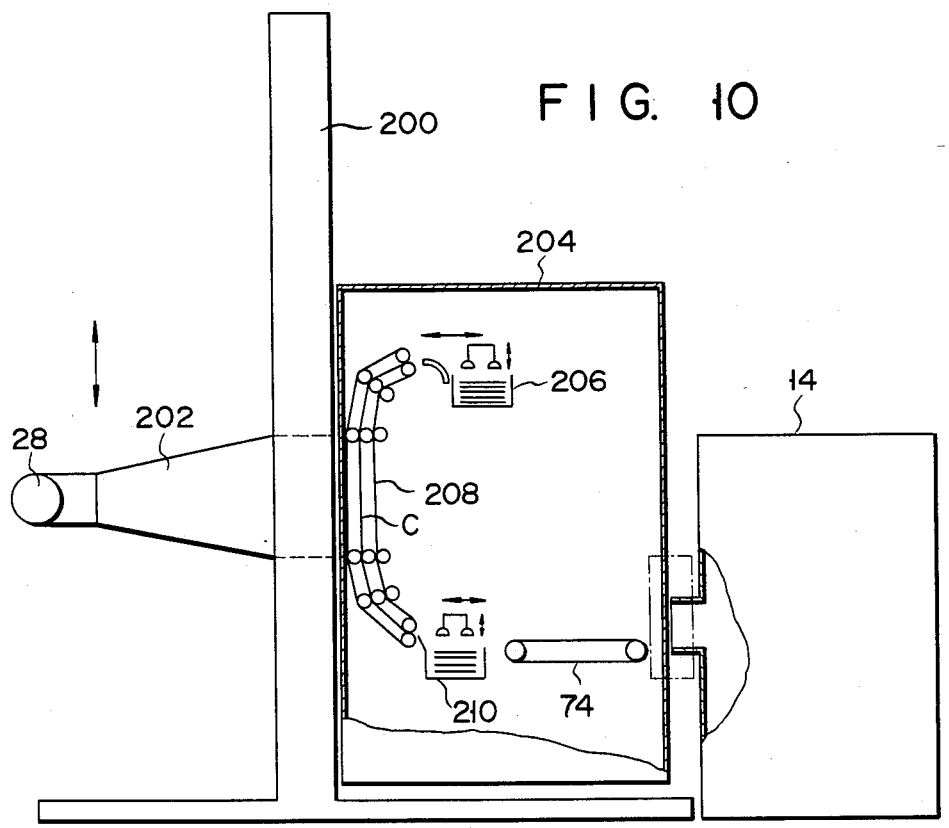
FIG. 10 is a cutaway, schematic view showing a radiation photographing device according to another embodiment of the present invention.
Figure 9:
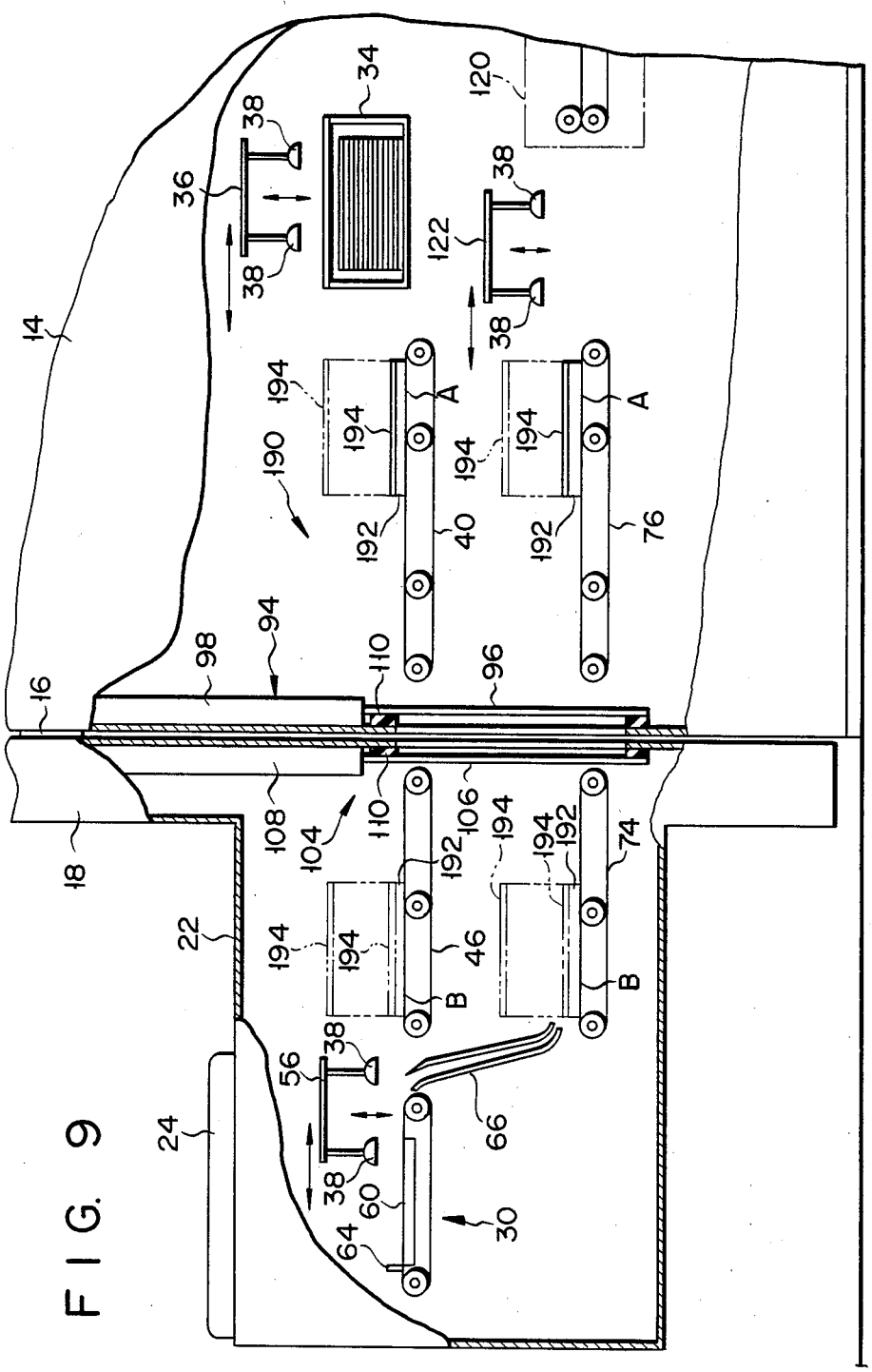
FIG. 9 is a cutaway, schematic view showing a radiation photographing and reading apparatus according to a modified embodiment of the invention.

The present invention is not limited to the embodiment described above. FIGS. 8 to 10, show modified embodiments of the invention. In FIG. 8, there is shown a modification of the second feed belt conveyor 46 (or first return belt conveyor 74). A second feed belt conveyor 180 shown in FIG. 8 can move through the opening 54 of the bed housing 22. The second feed belt conveyor 180 includes, for example, an endless traveling belt 182, a pair of large rollers 184 for driving the traveling belt 182, and a pair of small rollers 186 located halfway between the large rollers 184. The large roller 184 located beside the opening 54 can get into and out of the bed housing 22 through the opening 54, while the small rollers 186 can move up and down. Constructed in this manner, the second feed belt conveyor 180 can shift its position between the contracted position represented by a solid line and the extended position represented by the dashed line. With use of the secnd feed belt conveyor 180, therefore, the distance between the first and second feed belt conveyors 40 and 180 can be shortened even though the distance between the respective side walls 42 and 48 of the main housing 14 and the bed housing 22 is greater than the length of the IP. Thus, the IP can be delivered between the first and second feed belt conveyors 40 and 180 with high reliability. In this modified example, the second feed belt conveyor (or first return belt conveyor) is flexible. It is to be understood, however, that the same effect may be obtained if the first feed belt conveyor (or second return belt conveyor) is made flexible.

FIG. 9 shows a modification of the IP circulating mechanism. In the circulating mechanism 190 showm in FIG. 9, magazines 192 each having an openable cover 194 and containing a plurality of IPs (or EIPs) are transferred in place of the individual IPs (or EIPs) which are transferred in the aforementioned embodiment. With this arrangement, the IPs (or EIPs) are shielded from light by the magazines 192 while they are delivered between the main housing 14 and the bed housing 22. Thus, in the case of the modified example of FIG. 9, the shielding coupling 82 of the mechanism 80 used in the aforementioned embodiment can be omitted, so that construction of the shielding mechanism 80 may be simplified. In this case, when both the first and second shielding shutters 94 and 104 are opened, an openable cover of the IP tray 34, as well as the openable covers of all the magazines 192, are naturally closed. In the modification of FIG. 9, moreover, the magazines 192 can be transferred in both forward and reverse directions by the first and second feed belt conveyors 40 and 46 and the first and second return belt conveyors 74 and 76. Mechanisms for opening and closing the openable covers 194 of the magazines 192 and the openable cover of the IP tray 34 are not shown in FIG. 9.

For example, first and second magazines 192 are provided on the feed belt conveyor side so that they are transferred by the first and second feed belt conveyors 40 and 46, respectively. The first magazine 192 is located in position A in the main housing 14 represented by a solid line, and the second magazine 192 in position B in the bed housing 22 represented by a dashed line. If the positions of the first and second magazines 192 can be changed by simultaneously transferring the magazines 192 on the first and second belt conveyors 40 and 46, the IPs in the IP tray 34 can be fed into the first magazine 192 in position A while the IPs in the second magazine 192 are being taken out for X-ray photographing. Likewise, two magazines are provided on the side of the first and second return belt conveyors 74 and 76. With this arrangement, the time required for the feed of the IPs from the main housing 14 into the bed housing 22 can greatly be reduced, thereby permitting enhanced speedy X-ray photography.

FIG. 10 shows an X-ray photographing and reading apparatus used primarily in thoracic X-ray photography. The X-ray photographing apparatus shown in FIG. 10 is provided with a fixed stand 200. A supporting arm 202 (i.e., a movable base) is attached to the fixed stand 200. The X-ray tube 28 is mounted on the supporting arm 202 and is vertically movable. Also, a photographing housing 204 is attached to the supporting arm 202 so as to face the X-ray tube 28. The photographing housing 204 can vertically move in synchronism with the X-ray tube 28 by means of the supporting arm 202. The photographing housing 204 corresponds to the bed housing 22 of the foregoing embodiment. In the X-ray photographing and reading apparatus of FIG. 10, IPs are taken out one by one from a supply tray 206 set in the photographing housing 204, and are transferred to and located in a photographing position or position C by a transfer system 208. After X-ray photographing is completed, EIPs are transferred to and collected in a recovery tray 210 by the same transfer system 208. Thereafter, the EIPs in the recovery tray 210 are carried into the main housing 14 through a return path similar to the combination of the first and second return belt conveyors 74 and 76 shown in FIG. 2. It is to be understood that, in the X-ray photographing and reading apparatus of FIG. 10, the same shielding mechanism 80 of FIG. 2 is disposed between the main housing 14 and the photographing housing 204.

In the above description of the several modified embodiments, like reference numerals are used to designate like members shown in FIG. 2.

What is claimed is:

1. A radiation photographing and reading apparatus for producing images of an object, said apparatus comprising:

an unexposed radiation image converting plate for absorbing X-ray energy in relation to the image of the object to become an exposed plate, said exposed plate emitting the absorbed energy as a stimulable light when exposed to a light beam;

a radiation photographing device for radiation photographing the object, said radiation photographing device including first photographing device transfer means for placing said unexposed plate in a photographing position for radiation photographing the object, a movable base, a radiation tube for providing said X-ray energy to said base, and a photographing housing mounted on said base and facing said radiation tube, said photographing housing being disposed to move together with said base, said photographing housing containing a holder for said unexposed plate to face said radiation tube for irradiation of said plate with said X-ray energy, and said photographing housing including a first wall having a first opening;

a reading device fixedly disposed adjacent to and spaced from said radiation photographing device for reading said exposed plate by scanning said exposed plate with said light beam, said reading device detecting and converting into an electric signal said stimulable light emitted from said exposed plate by scanning said exposed plate with said light beam, said electric signal corresponding to a fluoroscopic image of the object, said reading device including first reading device transfer means spaced from and aligned to cooperate with said first photographing device transfer means for transferring said plate from said reading device to said first photographing device transfer means, feed means for transporting said exposed plate to said first reading device transfer means, and a housing, said reading device housing including a second wall spaced from, adjacent to and substantially parallel with said first wall of said photographing housing, said second wall including a second opening aligned with said first opening; and coupling means movable along a direction substantially perpendicular to said first and second walls and enclosing said first and second openings for coupling said photographing housing to said reading device housing, said coupling means including shielding means for preventing said unexposed plate and said exposed plate from being exposed to external light while said plate is being transferred between said first and second openings by said first photographing device transfer means and said first reading device transfer means, and said coupling means further including resilient means to absorb shock and vibration from said radiation photographing device to prevent said shock and vibration from being transmitted to said reading device.

2. The apparatus according to claim 1, wherein:

said first photographing device transfer means includes a transfer belt conveyor for transferring said unexposed plate from said reading device to said holder in said photographing housing; and said first reading device transfer means includes a transfer belt conveyor for transferring said unexposed plate from said reading device to said first photographing device transfer belt conveyor;

said first photographing device transfer belt conveyor and said first reading device transfer belt conveyor being aligned with said first and said second openings for transferring said unexposed plate from said first reading device transfer belt conveyor to said first photographing device transfer belt conveyor through said openings.

3. The apparatus according to claim 2, wherein said photographing housing includes first shutter means movably mounted to close said first opening to prevent external light from entering said photographing housing through said first opening by causing said first shutter means when said shielding coupling member is disengaged.

4. The apparatus according to claim 3, wherein said shielding means comprises a shielding coupling member interposed between said first wall and said second wall for shielding between said first and second openings when said unexposed plate is transferred between said reading device housing and said photographing housing;

said shielding coupling member being mounted on one of said first wall of said photographing housing and said second wall of said reading device housing, said shielding coupling member including engaging means for engaging the other of said first and second walls, said engaging means including an engaging surface on said shielding coupling member opposing said one of said first and second walls for engaging said other of said first and second walls.

5. The apparatus according to claim 1, further comprising a magazine for containing a plurality of said unexposed plates in a shielded manner while said unexposed plates are transferred by said first photographing device transfer means and said first reading device transfer means.

6. The apparatus according to claim 5, wherein at least one of said first photographing device transfer belt conveyor, said first reading device transfer belt conveyor, said second photographing device transfer belt conveyor and said second reading device transfer belt conveyor includes expansion means to expand through at least one of said first and said second openings.

7. The apparatus according to claim 1, wherein:
said radiation photographing device further includes second photographing device transfer means for removing said exposed plate from said holder and transferring said exposed plate to said reading device;
said reading device further includes second reading device transfer means aligned to cooperate with said second photographing device transfer means for receiving said exposed plate from said second photographing device transfer means and transferring said exposed plate to said reading device.

8. The apparatus according to claim 7, wherein:
said second photographing device transfer means comprises a transfer belt conveyor; and
said second reading device transfer means comprises a transfer belt conveyor;
said second photographing device transfer belt conveyor and said second reading device transfer belt conveyor being aligned with said first and said second openings for transferring said exposed plate from said second photographing device transfer belt conveyor to said second reading device transfer belt conveyor through said openings.

9. The apparatus according to claim 4, wherein:
said shielding coupling member is movably and extendably mounted on said one of said first and second walls and is movable along a direction substantially perpendicular to said first and said second walls and through said first and said second openings; and
said engaging means engages said other of said first and said second walls when said shielding coupling member is extended.

10. The apparatus according to claim 8, wherein said reading device housing includes second shutter means movably mounted to close said second opening to prevent external light from entering said reading device through said second opening by closing said second shutter means when said shielding coupling member is disengaged.

11. The apparatus according to claim 9, wherein said shielding means further comprises driving means connected to said shielding coupling member for selectively extending and retracting said shielding coupling member.

12. The apparatus according to claim 9, wherein said resilient means comprises a shielding seal disposed on said engaging surface, said shielding seal being interposed between and contacting said engaging surface and said other of said first and second walls.

* * * * *